May 23, 1939. E. P. SMITH 2,159,185
TUBE JOINT TOOL
Filed March 16, 1938
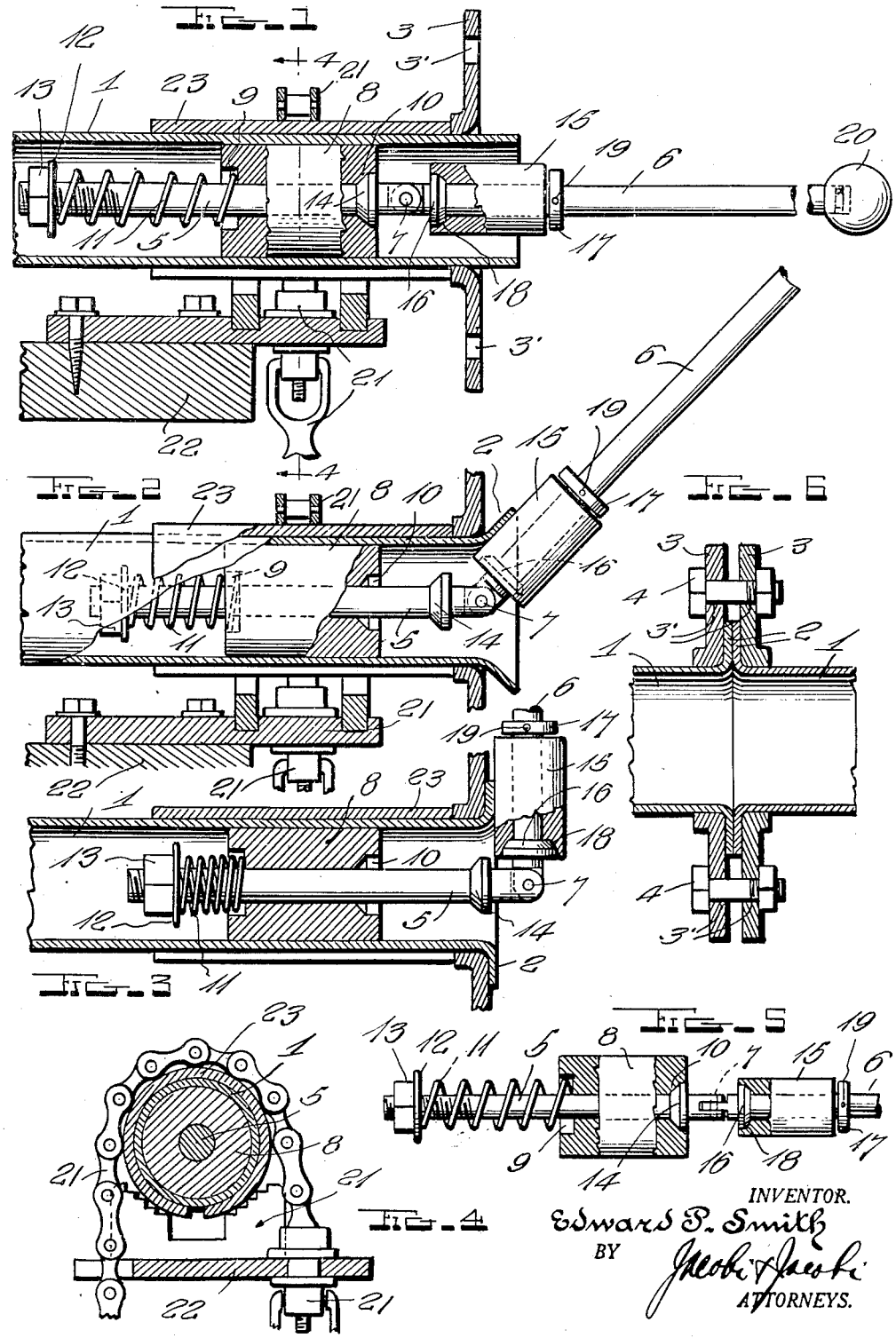
INVENTOR.
Edward P. Smith
BY
Jacobi & Jacobi
ATTORNEYS.

Patented May 23, 1939

2,159,185

UNITED STATES PATENT OFFICE 2,159,185

TUBE JOINT TOOL

Edward P. Smith, South Charleston, W. Va.

Application March 16, 1938, Serial No. 196,281

4 Claims. (Cl. 153—81)

This invention relates to a tube joint tool and it is one object of the invention to provide a tool by use of which ends of tubes which are to be secured in end to end engagement with each other may have flanges formed thereon for engagement with rings or collars having securing bolts passed through the same.

Another object of the invention is to so form the tool that when it is in use a portion thereof may be firmly mounted within a tube and an arm carrying a roller then swung in a circular path so that the roller will engage a protruding end of the tube and flare the same to form a flange.

Another object of the invention is to provide a tool of this character wherein the roller-carrying arm or lever is pivoted to a shank slidably and rotatably mounted through a block which fits tightly into a tube, the shank being yieldably held against outward sliding movement so that pull will be applied to the shank and the arm held in its proper angular position during formation of a flange at the end of the tube.

Another object of the invention is to so form the shank that retractive movement thereof by the spring will be limited and in addition provide a spring abutment which is adjustable in order to place the spring under desired tension.

Another object of the invention is to provide a tool by use of which companion coupling members may be formed upon ends of a pair of tubes to be connected with each other and a coupling thus formed which will be very tight and free from danger of leakage due to corrosion or other chemical reactions when the united tubes are used in chemical work.

Still another object of the invention resides in providing a device which is simple and durable in construction, inexpensive to manufacture and one which will be very efficient in operation and application to use.

With these and numerous other objects in view, my invention consists in the novel features of construction, combination and arrangement of parts as will be hereinafter referred to and more particularly pointed out in the specification and claims.

The invention is illustrated in the accompanying drawing wherein:

Figure 1 is a sectional view taken longitudinally through a tube and showing the improved tool in position for use;

Figure 2 is a view similar to Figure 1 showing a flange partially formed at the end of the tube;

Figure 3 is a view showing the flange completed;

Figure 4 is a transverse sectional view taken along the line 4—4 of Figure 1;

Figure 5 is a view of the tool removed from the tube and shown partially in longitudinal section and partially in elevation;

Figure 6 is a sectional view showing tube ends joined by couplings formed in accordance with this invention.

There are certain types of chemical apparatus in which elements thereof consist of tubes 1 which are disposed in end to end relation to each other and must have their abutting ends coupled to each other in such a manner that a tight joint will be formed. Referring to Figure 6 it will be seen that each tube has its end portion formed with an outstanding annular flange 2, the flanges of the two tubes being disposed in face to face engagement with each other and engaged by rings or collars 3 formed with a suitable number of openings 3' through which bolts 4 are passed in order that the rings may be drawn towards each other and held firmly together. As the tubes are of copper or some other soft metal and the rings formed of strong hard metal the flanges will be pressed into very close contacting engagement with each other and a joint formed which will be very tight and leakage of gas, liquid, or any other fluid prevented.

The flanges are formed by means of a flange forming tool shown in Figure 5 and operated as illustrated in Figures 1, 2 and 3. Referring to these figures it will be seen that the tool has a shank 5 and an arm or lever 6 which is pivoted to the outer end of the shank by a hinge joint 7. A block 8 fits loosely about the shank and has its bore formed with enlarged end portions forming seats 9 and 10. A helical spring 11 which is coiled about the shank has one end abutting the block within the seat and its other end engaging a washer 12 which fits loosely about the shank and bears against a nut 13. This nut is threaded upon the shank and by adjusting the position of the nut upon the shank tension of the spring may be regulated and pull exerted upon the shank controlled. Movement of the shank under influence of the spring is limited by the collar 14 which is formed integral with the outer end portion of the shank and shaped to fit snugly within the seat 10. By providing the collar of the tapered shape shown the shank will be very effectively prevented from shifting longitudinally in an inward direction beyond the position shown in Fig. 1 while at the same time, it will be permitted to turn freely in the block 8.

The lever 6 and the roller 15 carried thereby constitutes the means by which the end of the tube 1 is formed with the flange 2. The roller is formed of hard metal and is rotatably carried by the shank between the stationary collar 16 and the adjustable collar 17, and referring to Fig. 1, it will be seen that the stationary collar which is formed integral with the lever is of a tapered formation similar to the collar 14 and received in a similarly shaped pocket or recess 18 formed in the inner end of the roller. This collar serves as a thrust bearing for the roller and movement of the roller longitudinally of the lever out of its proper position relative to the collar is prevented by the collar 17 which is held in an adjusted position by a set screw 19. The knob 20 at the outer free end of the lever provides a convenient hand hold when operating the device and is removable in order that removal of the collar 17 may be effected and a new roller applied when necessary.

When this device is in use, a tube 1 is held stationary in a vise 21 which has been illustrated as a chain vise but may be of any other type desired and is secured upon a work bench 22. A split sleeve 23 is fitted about the tube in order to protect the tube and prevent damage by the teeth of the vise when the chain is tightened. The block 8 is of such diameter that it fits snugly within the tube and it is to be understood that each of the devices will include a number of blocks of different diameters which will be selectively applied to the shank according to the diameter of the tube to be operated upon. When the chain of the vise is tightened, the sleeve will be compressed tightly about the tube and since the tube is of soft metal, it will give enough to cause the block to be gripped and firmly held in a stationary position in the tube. The outer end portion of the tube projects from the sleeve a predetermined distance according to the size of flange 2, it is desired to form, and the collar or disk 3 is slid into place about the protruding end of the tube and brought into position against the outer end of the sleeve. The lever is then grasped by its knob 20 and swung in a circular path to bring the roller into engagement with the inner surface of the end of the tube, pressure of the roller against walls of the tube will cause the tube to be gradually flared as shown in Fig. 2 and finally forced flat against ring as shown in Fig. 3 to form the flange 2. As the end of the tube is flared and formed into the flange, the pressure upon the lever arm 6 will exert pull upon the shank and the shank will be shifted outwardly against action of the spring 11. The inward pull of the spring causes the lever to be maintained at the proper incline during formation of the flange and will return the lever and the shank to the retracted position after formation of the flange has been completed. When formation of the flange is completed, the chain of the vise will be released and the tube and sleeve removed from the vise. The split sleeve is then removed from the tube. A pair of tubes may then be disposed in end to end engagement with each other and bolts 4 passed through the openings of the disks 3, after which the nuts of the bolts are applied and tightened to draw the disks towards each other and apply pressure upon the flanges to hold them in close face to face engagement with each other. The tubes will thus be coupled to each other and a joint formed which is very tight and all leakage will be prevented.

From the foregoing description of the construction of my improved device, the operation thereof and the method of applying the same to use, will be readily understood. It will be seen that I have provided a simple, inexpensive and efficient means for carrying out the objects of the invention and while I have particularly described the elements best adapted to perform the function set forth, it is obvious that various changes in form, proportion and in the minor details of construction may be resorted to, without departing from the spirit or sacrificing any of the principles of the invention.

Having thus described the invention, what is claimed is:

1. A tool of the character described comprising a block of a diameter adapting it to fit snugly within a tube, a shank slidably and rotatably engaged through said block longitudinally thereof, a spring about said shank having one end engaging the inner end of the block for yieldably resisting outward sliding movement of the shank through the block, an abutment for the other end of said spring threaded upon said shank for adjustment along the same for adjusting tension of the spring, a lever arm pivoted to the outer end of said shank for movement from a position in axial alinement with the shank to a position transversely thereof, and a roller rotatably carried by said lever arm adjacent the pivoted end thereof for acting upon an end portion of a tube having the block and shank mounted therein and flaring the walls of the tube to form a circumferentially extending flange.

2. A tool of the character described comprising a block to fit within a tube, a shank extending longitudinally through said block and being slidably and rotatably mounted therein, a lever arm pivoted to the outer end of said shank for movement from a position in axial alinement with the shank to a position transversely thereof, resilient means yieldably resisting outward sliding movement of said shank, means for adjusting the tension of the resilient means, and a roller carried by said lever arm for acting upon walls of a tube and flaring the walls outwardly to form an annular outstanding flange when the lever arm is swung in a circular path and shifted towards a position at right angles thereto.

3. A tool of the character described comprising a block to fit within a tube, said block having a longitudinally extending bore formed with enlarged end portions constituting seats, a shank slidably and rotatably engaged through the bore of said block, a collar carried by the outer end portion of said shank to fit within the seat at the outer end of said block, an abutment adjustably carried by the inner end portion of said shank, a spring coiled about the shank between the abutment and said block and having one end engaging the abutment and its other end received in the seat at the inner end of the block, a lever arm pivoted to the outer end of said shank, a fixed collar carried by the inner end portion of said lever arm, a roller fitting about said lever arm and having its inner end formed with a recess constituting a seat receiving the collar, and a collar for engagement by the outer end of the roller fitting about the lever arm and adjustably secured thereon.

4. A tool of the character described comprising a block of a diameter adapting it to fit snugly within a tube, a shank rotatably engaged through said block and slidable longitudinally thereof, means to yieldably resist outward sliding movement of said shank, a lever arm pivoted to the outer end of said shank for movement from a position in longitudinal alinement therewith to a position transversely thereof, and a flange forming roller carried by said lever arm.

EDWARD P. SMITH.